Feb. 17, 1953 R. E. GRAHAM 2,629,011

TELEVISION SYSTEM HAVING REDUCED TRANSMISSION BANDWIDTH

Filed Dec. 30, 1949 2 SHEETS—SHEET 1

INVENTOR
R. E. GRAHAM

BY Hugh S. Wertz

ATTORNEY

INVENTOR
R. E. GRAHAM
BY
Hugh S. Wertz
ATTORNEY

Patented Feb. 17, 1953

2,629,011

UNITED STATES PATENT OFFICE 2,629,011

TELEVISION SYSTEM HAVING REDUCED TRANSMISSION BANDWIDTH

Robert E. Graham, Morristown, N. J., assignor to Bell Telephone Laboratories, Incorporated, New York, N. Y., a corporation of New York Application December 30, 1949, Serial No. 136,107

7 Claims. (Cl. 178—6.8)

This invention relates to the translation, transmission, reception, and reproduction of electric communication signals, particularly television image signals and the like.

The principal object of the invention is to effect a substantial reduction in the width of the frequency-band required for the transmission of such signals as compared with the band width required when the transmission is effected by the apparatus and in accordance with methods commonly in use.

In a copending application of the present inventor, Serial No. 136,105, filed December 30, 1949, there is disclosed a system for the reduction of the transmission band width of television image signals in which the reduction is achieved by discarding a major portion of the fine detail video information. In accordance with the present invention and in furtherance of its broad object, a further reduction in transmission band width is achieved by the systematic non-utilization of a portion of the available coarse video information. This is done by reducing the number of scanning lines per frame in the coarse image dissector of a dual camera tube arrangement similar to that described in the copending application. This procedure requires an additional storage operation at the receiving point in order to alter the coarse signal to the proper number of lines. The additional saving in band width afforded by this invention is obviously in a different direction from that of the band width reduction scheme disclosed in the copending application.

The invention will be more fully understood by referring to the following detailed description taken in connection with the accompanying drawings forming a part thereof, in which.

Figure 1:
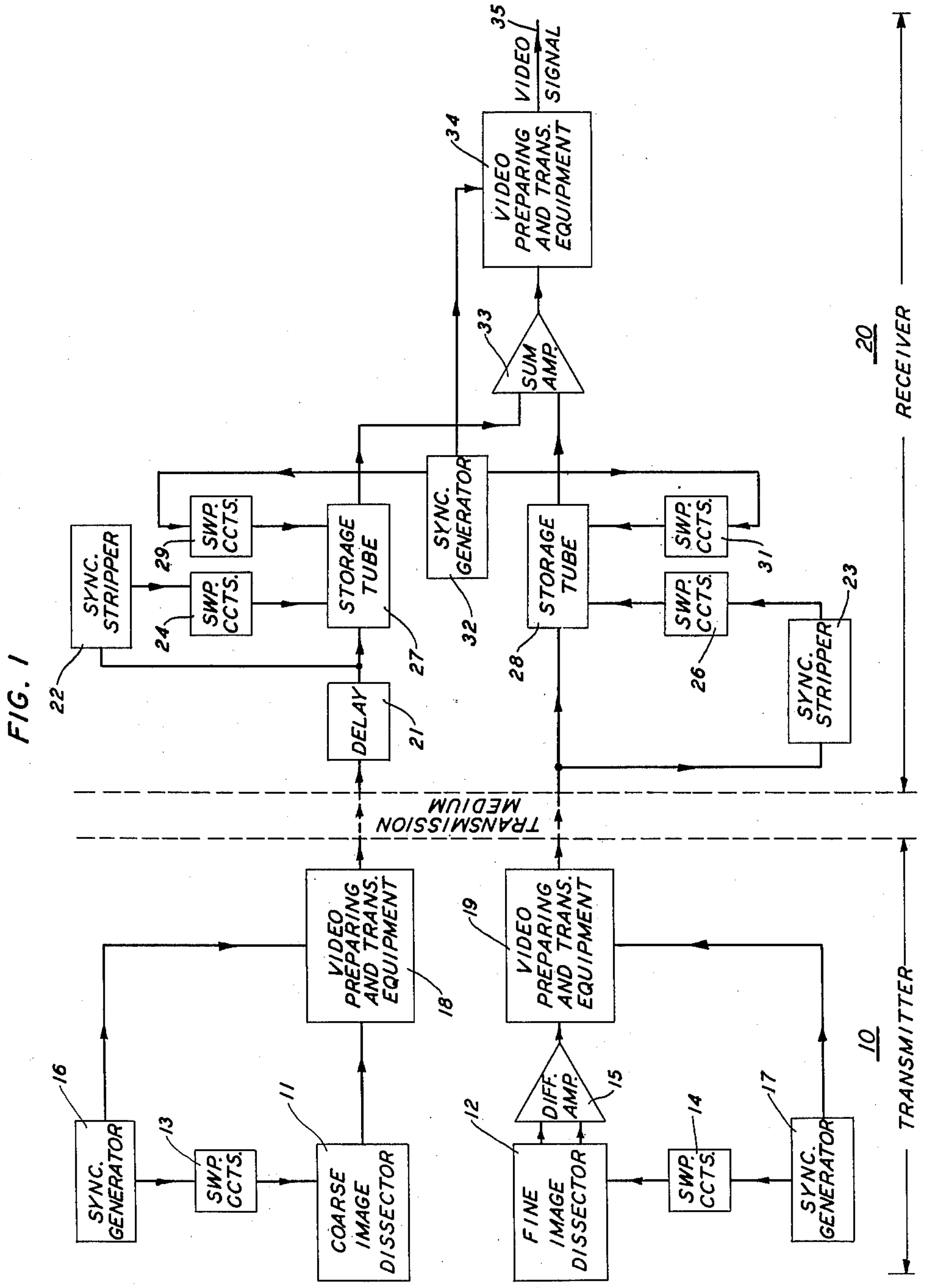
Fig. 1 is an overall block diagram of an exemplary arrangement of a reduced band width television system which operates in accordance with the invention.

In accordance with the exemplary embodiment of the invention shown in Fig. 1, the television image is separated at the transmitting end into coarse and fine fields or signals by the use of special scanning apertures (in camera tubes 11 and 12), which are discussed more fully below in connection with Figs. 2 and 3. By this means, the coarse-fine separation can be effected in all directions equally, rather than solely along the scanning direction, which is the situation when electrical filters are used as separating media in accordance with one aspect of the copending application. Since the vertical height of the coarse scanning aperture (in camera tube 11, the coarse image dissector) may be many times the conventional scanning-line pitch, it is possible to use a coarser scanning line structure, i. e., fewer total lines in the coarse dissector tube raster, without deterioration of the quality of the image. It is this reduction in the number of scanning lines which, as mentioned above, effects the further frequency band economy of the present invention.

At the transmitting end 10, sweep circuit 13 for the coarse image dissector 11 is controlled by a local synchronization generator 16, in accordance with usual electronic techniques. Similarly, sweep circuit 14 for the fine image dissector 12 is controlled by a local synchronization generator 17. The scan for the coarse dissertor is at a normal frame rate of $n$ frames per second (preferably interlaced, according to R. M. A. standards), but at a reduced scanning line rate of $N_1$ lines per frame. The sweep rates for the fine image dissector are $n_1$ frames per second ($n_1$ being less than $n$, as in the similar arrangement in the copending application), and a normal number N lines per frame ($N_1$ being less than N). The required synchronization and blanking signals, which are generated in accordance with standard television practice, are mixed with the coarse and fine signals before transmission. The circuits in which these operations occur have been subsumed, for convenience and simplicity of exposition, under the designation "video preparing and transmitting equipment" and are so identified as elements 18 and 19 of Fig. 1. The circuits of element 18 operate on the coarse signal from the coarse dissector and the circuits of element 19 on the fine signal from the fine dissector and the differential amplifier 15 (the function of which informing the fine signal is discussed more fully below).

At the receiving end 20 of the system, the coarse signal passes through a delaying means 21 where it is delayed by about $$\frac{1}{2n_1}$$

seconds to match the average time delay in the fine signal due to its lower frame repetition rate. (That this is the proper amount of delay is readily demonstrable.) Then both coarse and fine signals are stored at sweep rates controlled by their self-contained synchronization signals. A synchronization signal stripper circuit 22, of a type well known in the electronic art, strips the synchronizing signals from the coarse signal and these synchronizing signals control a sweep circuit 24, which thus causes the recording beam of a storage tube 27 to sweep at the coarse signal rate of $n$ frames per second and $N_1$ lines per frame. Similarly, synchronization signal stripper circuit 23 controls a sweep circuit 26 which causes the recording beam of a storage tube 28 to sweep at the fine signal rate of $n_1$ frames per second and N lines per frame.

A local synchronizing signal generator 32, which operates in accordance with ordinary television practice, controls sweep circuits 29 and 31, which cause identical sweep rates of the pickup beams of both the fine signal storage tube 28 and the coarse signal storage tube 27. This rate is the normal television rate, hereinabove designated as $n$ frames per second and N lines per frame. This synchronization generator 32 is, in the figure, shown as being free-running, but it is obviously equally within the ambit of the invention for it to be locked at $n$ frames per second by the synchronizing components contained in the received coarse signal. The coarse and fine signals are now both on an $n$ frames per second, N lines per frame basis, and these component signals are added together in an ordinary summation amplifier 33 and mixed, in a circuit 34 in accordance with well known electronic techniques, with a standard synchronizing wave-form from the receiver synchronization generator 32. The output video signal 35 thus obtained is a conventional video signal except when there is motion or change in the pictorial subject matter. The difficulties introduced by such motion are, in accordance with the invention, substantially avoided by the automatic gain control arrangement described in connection with Fig. 5 of the above-identified copending application, or, alternatively, by the motional correlation system set forth in another copending application, Serial No. 136,106, filed December 30, 1949.

The advantages of the above-described system will be apparent from a closer examination of certain characteristics thereof. The permitted increase in horizontal blurring for the coarse field can conveniently be designated as $$\frac{1}{k}$$

It is then readily demonstrable that, if N is the conventional number of scanning lines per frame and $N_1$ is the number of lines per frame for the coarse signal, the required band width for the coarse signal is:

$$\text{Coarse band}=\left(0 \text{ to } k\frac{N_1}{N}f_m\right)$$

where $f_m$ is the maximum video frequency normally transmitted by the system. It can also be readily shown that the fine signal frequency range is given by:

$$\text{Fine band}=\left(k\frac{n_1}{n}f_m \text{ to } \frac{n_1}{n}f_m\right)$$

where $n$ is the normal frame repetition rate and $n_1$ is the reduced repetition frame rate characteristic of this invention and that of the copending application, Serial No. 136,105, filed December 30, 1949.

Although great band width economy can be achieved by making the reduced number of scanning lines $N_1$ very small, such a technique introduces the danger of too coarse a scanning structure, with the consequence that the image will be intolerably degraded. Thus, it has been found convenient in the practice of the invention to allow roughly twice as much vertical overlap of the coarse scanning aperture as in the conventional television system. This approximate relationship is represented by $$\frac{N_1}{N}=2k$$

This is obviously a reasonable requirement when $k$ is very much smaller than unity, i. e., when the new scanning structure is much coarser than the conventional structure, which is in accordance with the practice of the invention.

An examination of the above relationships with respect to some exemplary values which may be considered to be typical of preferred practice will be valuable. For purposes of illustration, therefore, it is assumed that $k=0.1$, $$\frac{n_1}{n}=0.1$$

and the maximum video frequency $f_m=4$ megacycles per second. It is then readily seen that, fixing $$\frac{N_1}{N}=0.2$$

the required frequency bands become:

Coarse band=0 to 80 kilocycles per second, and
Fine band=40 to 400 kilocycles per second.

The total required frequency band is thus approximately 400 kilocycles, which for the illustrative values chosen is, as readily as can be shown, a two-to-one economy as compared with the basic band width reduction system disclosed in the copending application, Serial No. 136,105, and approximately a ten-to-one saving in band width as compared with the conventional television transmission systems now in common use.

It is to be noted that the coarse signal now corresponds (referring to the exemplary values chosen above) to a picture field having about 50 picture elements horizontally and 100 vertically. That is, in addition to the original responsibility for horizontal sharpness as in the copending application, Serial No. 136,105, much of the burden of vertical sharpness has been shifted to the slowly-repeated fine signal, whose required band width is scarcely affected thereby.

It is evident that it is also in accordance with the invention to use the saving resulting from the coarsening of the scanning line structure to improve the horizontal resolution of the coarse field, while maintaining the same band width as required in accordance with the techniques and using the apparatus disclosed in the copending application, Serial No. 136,105. In order to illustrate this aspect of the invention, $k$ can conveniently be set at 0.25 and $$\frac{N_1}{N} \text{ at } 0.4$$

with the other exemplary values the same as those set forth in the discussion of the example of practice described above. These illustrative values yield only a 1.6 to 1 increase in vertical overlap, but this is sufficient, according to the practice of the invention, since the coarsening of the scanning line structure is only 2.5 times in this case. In this illustrative example, the required frequency bands are:

Coarse band=0 to 400 kilocycles per second
Fine band=100 to 400 kilocycles per second which, it can readily be shown, is closely approximate to the frequency band requirements of the basic system outlined in the copending application, assuming the same illustrative values. The resulting coarse signal in this example of practice corresponds, however, to a picture field containing 125 picture elements horizontally and 200 vertically. During those times when there is appreciable motion in the televised scene and the coarse field must bear the brunt of the imagery, this 125 by 200 element arrangement is a more satisfactory one than the 50 by 500 element field characteristic of the system of the copending application. (It should be noted that a conventional picture field, i. e., one transmitted in accordance with present standard American television practice, 525 lines per field and 4 megacycles per second, has been assumed, for clarity of exposition, to be approximately a 500 by 500 element field.)

Figure 2:
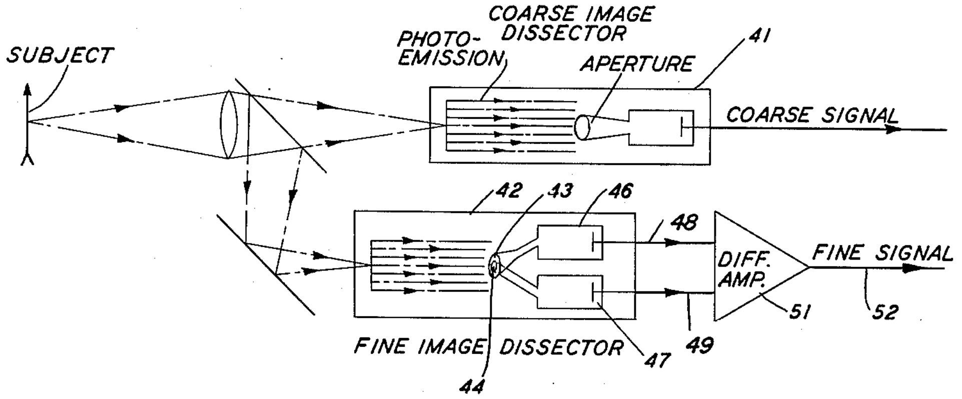
Fig. 2 shows an illustrative image dissector tube arrangement which can be used in the practice of the invention to separate from each other the coarse and fine detail components of the video information.

In accordance with the invention, the separation of the coarse and fine components can be effected by the use of the exemplary arrangement shown in Fig. 2. In that figure, the coarse image dissector 41 is a well-known type of dissector tube, such as, for example, the Philo T. Farnsworth image dissector. (See, e. g., Zworykin and Morton, Television (1940), page 230 et seq.) In the fine image dissector 42, one aperture 43 is made large, of a size corresponding to that in the coarse dissector, while the other one 44 is made much smaller, i. e., approximately the conventional size, and these apertures 43 and 44 are concentric. The electrons passing through the two apertures are amplified by separate electron multipliers 46 (large aperture) and 47 (small aperture) to yield usable signal outputs 48 and 49, respectively. The relative multiplier gains are so adjusted that the two output signals 48 and 49 are equal when a uniform density of electrons impinges upon both apertures. These two signals are then fed to a differential amplifier 51 which yields an output 52 proportional to the difference between the two signals 48 and 49, being zero when the two signals are equal. In this arrangement, the two aperture signals substantially cancel each other for very gradual (i. e., "coarse") changes in picture brightness, irrespective of the direction in the picture along which the changes are taking place. For the more "sharp" changes in picture brightness, however, the two apertures respond differently, the fine aperture 44 faithfully following the detail and the coarse aperture 43 following only the average trend. Thus, the output of the differential aperture is zero for long-pitch variations in brightness and is a proportional representation for short-pitch variations in brightness (within, of course, the resolution capability of the fine aperture). It is evident that the action of the two apertures 43 and 44 and the differential amplifier 51 is analogous to that of a high-pass electrical filter.

Figure 3:
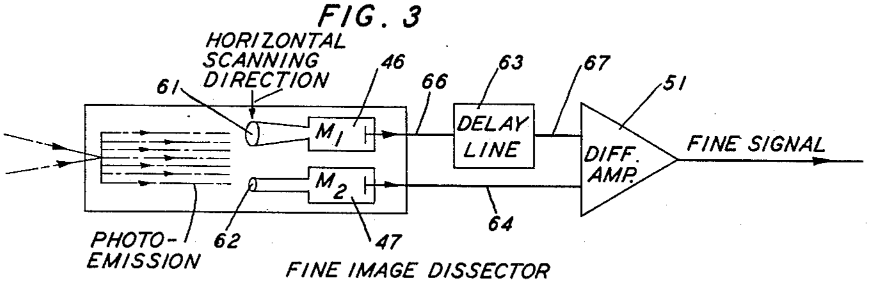
Fig. 3 illustrates another exemplary embodiment of the fine component image dissector tube, also in accordance with the invention.

In the fine image dissector shown in Fig. 3, which is another exemplary embodiment that can be used in the practice of the invention, the two apertures 61 and 62 are not in fact concentric, but they are disposed along a scanning line so that one aperture center traverses any given vertical contour of the picture (electron image) a time $\tau$ ahead of the other aperture center. In the arrangement as drawn, the output 66 from electron multiplier 46 (which operates on the signals coming through wide aperture 61, the first aperture in time) is delayed by an amount $\tau$ in a delaying means 63, in accordance with techniques well known in the art. The delayed output 67 and the output 64 from an electron multiplier 47 of narrow (and second in time) aperture 62 are fed to the differential amplifier 51, just as in the arrangement of Fig. 2. The behavior of the illustrative arrangement of the fine dissector of Fig. 3 is the same as though the two apertures 61 and 62 were actually concentric, since these apertures are made to appear so by the use of the delay line 63.

Figure 4:
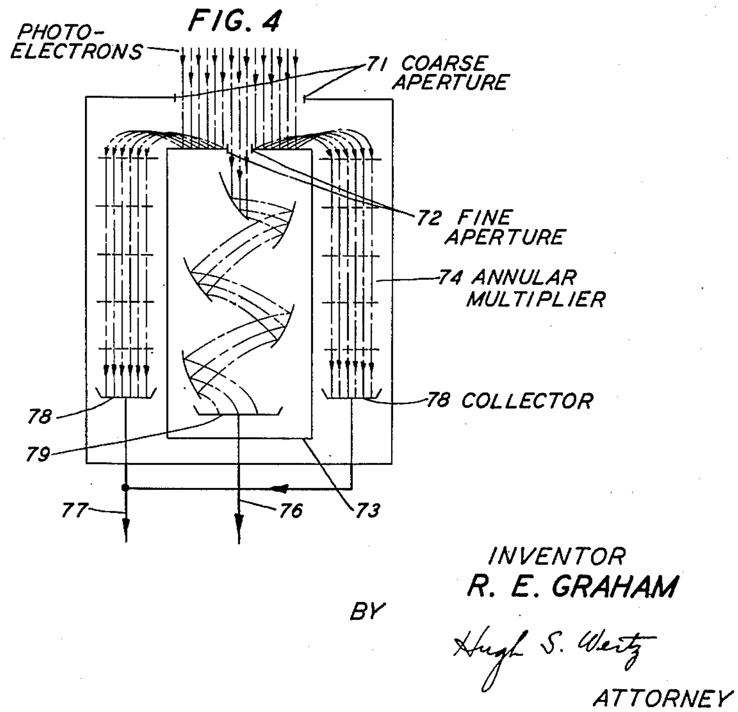
Fig. 4 shows still another illustrative arrangement of image dissector tube which can be used in the practice of the invention.

Still another illustrative arrangement for the separation of the coarse and fine detail in accordance with the invention is shown in Fig. 4. The apertures 71 and 72 are actually coaxial and are located in different planes. The signal 76 is simply the output from a collector 79 in a conventional multiplier 73, while the signal 77 is the output of a collector 78 in an annular multiplier 74, of a type which is well known in the electronic art and which can, for example, be of the general type used in the RCA Image Orthicon camera tube.

It is to be understood that the above described arrangements are illustrative of the application of the principles of the invention. Numerous other arrangements may be devised by those skilled in the art without departing from the spirit and scope of the invention.

What is claimed is:

1. A television system comprising means for forming signals representative of the coarse and fine detail components of the pictorial image, said means comprising two image dissector tubes one of which is adapted to generate a signal representative of only fine detail components and the other is adapted to generate a signal representative of only coarse components of the video information, means for scanning in the fine component image dissector at a fixed number of lines per frame, means for scanning in the coarse component image dissector at a fixed number of lines per frame, means for transmitting said component signals to a receiving station, means at the receiving station to increase the number of scanning lines per frame of the coarse component signal to equal the number of scanning lines per frame of the fine component signal, and means to combine said modified coarse components and said fine components into a complete video signal.

2. A television system comprising means for forming signals representative of the coarse and fine detail components of the pictorial image, said means comprising two image dissector tubes one of which is adapted to generate a signal representative of only fine detail components and the other is adapted to generate a signal representative of only coarse components of the video information, means for scanning in the fine component image dissector at a fixed number of lines per frame, means for scanning in the coarse component image dissector at a lesser number of lines per frame, means for transmitting said coarse components at one repetition rate, means for transmitting said fine components at another, reduced, repetition rate, means at the receiving station to increase the number of scanning lines per frame of the coarse component signal to equal the number of scanning lines per frame of the fine component signal and to increase the repetition rate of the fine component signal to equal the repetition rate of the coarse component signal, and means to recombine said modified coarse components and restored-rate fine components into a complete video signal.

3. A television system comprising means for forming signals representative of the coarse and fine detail components of the pictorial image, said means comprising two image dissector tubes one of which is adapted to generate signals representative of only fine detail components and the other adapted to generate signals representative of only coarse components of the video information, said image dissector which is adapted to generate signals representative of only fine detail components including two concentric apertures of differing diameters and a differential amplifier which is adapted to operate on signals transmitted through said apertures, means for scanning in the fine component image dissector at a fixed number of lines per frame, means for scanning in the coarse component image dissector at a lesser number of lines per frame, means for transmitting said component signals to a receiving station, means at the receiving station to increase the number of scanning lines per frame of the coarse component signal to equal the number of scanning lines per frame of the fine component signal, and means to recombine said modified coarse components and said fine components into a complete video signal.

4. A television system comprising means for forming signals representative of the coarse and fine detail components of the pictorial image, said means comprising two image dissector tubes one of which is adapted to generate signals representative of only fine detail components and the other adapted to generate signals representative of only coarse components of the video information, said image dissector which is adapted to generate signals representative of only fine detail components including two apertures of differing apertures, means to delay the signal transmitted through one of said apertures, and a differential amplifier which operates on said delayed signal and the signal transmitted through the other of said apertures, means for scanning in the fine component image dissector at a fixed number of lines per frame, means for scanning in the coarse component image dissector at a lesser number of lines per frame, means for transmitting said component signals to a receiving station, means at the receiving station to increase the number of scanning lines per frame of the coarse component signal to equal the number of scanning lines per frame of the fine component signal, and means to recombine said modified coarse components and said fine components into a complete video signal.

5. A television system comprising means for forming signals representative of the coarse and fine detail components of the pictorial image, said means comprising two image dissector tubes one of which is adapted to generate signals representative of only fine detail components and the other adapted to generate signals representative of only coarse components of the video information, means for scanning in the fine component image dissector at a fixed number of lines per frame, said scanning means being controlled by a first synchronizing signal generator, means for scanning in the coarse component image dissector at a lesser number of lines per frame, this scanning means being controlled by a second synchronizing signal generator, means for transmitting said component signals to a receiving station, means at the receiving station to increase the number of scanning lines per frame of the coarse component signal to equal the number of scanning lines per frame of the fine component signal, and means to recombine said modified coarse components and said fine components into a complete video signal.

6. A television system comprising means for forming signals representative of the coarse and fine detail components of the pictorial image, said means comprising two image dissector tubes one of which is adapted to generate signals representative of only fine detail components and the other adapted to generate signals representative of only coarse components of the video information, means for scanning in the fine component image dissector at a fixed number of lines per frame, means for scanning in the coarse component image dissector at a lesser number of lines per frame, means for transmitting said component signals to a receiving station, means at the receiving station to increase the number of scanning lines per frame of the coarse component signal to equal the number of scanning lines per frame of the fine component signal, said means including a storage tube device, the recording scan of which is at the reduced number of lines per frame and the pick-up scan of which is at the restored number of lines per frame, and means to recombine said modified coarse components and said fine components into a complete video signal.

7. A television system comprising means for forming signals representative of the coarse and fine detail components of the pictorial image, said means comprising two image dissector tubes one of which is adapted to generate signals representative of only fine detail components and the other adapted to generate signals representative of only coarse components of the video information, means for scanning in the fine component image dissector at a fixed number of lines per frame, means for scanning in the coarse component image dissector at a lesser number of lines per frame, means for transmitting said component signals to a receiving station, means at the receiving station to increase the number of scanning lines per frame of the coarse component signal to equal the number of scanning lines per frame of the fine component signal, and means including a storage tube device, the recording scan of which is at the reduced number of lines per frame and the pick-up scan of which is at the restored number of lines per frame, said pick-up scanning being controlled by an independent synchronizing signal generator, and means to recombine modified coarse components and said fine components into a complete video signal.

ROBERT E. GRAHAM.

REFERENCES CITED

The following references are of record in the file of this patent:

UNITED STATES PATENTS

| Number | Name | Date |
|---|---|---|
| 2,273,172 | Beers | Feb. 17, 1942 |
| 2,293,899 | Hanson | Aug. 25, 1942 |
| 2,306,435 | Graham | Dec. 29, 1942 |
| 2,307,728 | Mertz | Jan. 5, 1943 |
| 2,321,611 | Moynihan | June 15, 1943 |
| 2,381,901 | Goldsmith | Aug. 14, 1945 |
| 2,381,902 | Goldsmith | Aug. 14, 1945 |
| 2,460,093 | Law | Jan. 25, 1949 |